United States Patent [19]

Collier

[11] 4,031,827
[45] June 28, 1977

[54] POP-UP COVER FOR SLIPSTREAM GENERATOR

[75] Inventor: David M. Collier, Santa Barbara, Calif.

[73] Assignee: The United States of America as represented by the Secretary of the Air Force, Washington, D.C.

[22] Filed: Mar. 4, 1976

[21] Appl. No.: 663,639

[52] U.S. Cl. .......................................... 102/70.2 G
[51] Int. Cl.² ....................................... F42C 19/06
[58] Field of Search ............................... 102/70.2 G

[56] References Cited

UNITED STATES PATENTS

| | | |
|---|---|---|
| 3,757,695 | 9/1973 | Fisher ........................... 102/70.2 G |
| 3,861,312 | 1/1975 | Held et al. ..................... 102/70.2 G |
| 3,960,086 | 6/1976 | Fisher ........................... 102/70.2 G |
| 3,961,577 | 6/1976 | O'Steen ......................... 102/70.2 G |

Primary Examiner—Charles T. Jordan
Attorney, Agent, or Firm—Joseph E. Rusz; Arsen Tashjian

[57] ABSTRACT

An air-flow actuated power supply and switch device having a pop-up cover which includes an air scoop, a switch actuator mechanism and an interface cable as a part thereof. The power supply is activated by pulling a lanyard which causes the pop-up cover to rise and expose an air scoop causing electrical energy to be generated for operating an electric bomb fuze or the like. A breakaway coaxial cable incorporated in the device permits the injection of electrical signals from the aircraft to the fuze system by a radiation hazard detection system.

3 Claims, 8 Drawing Figures

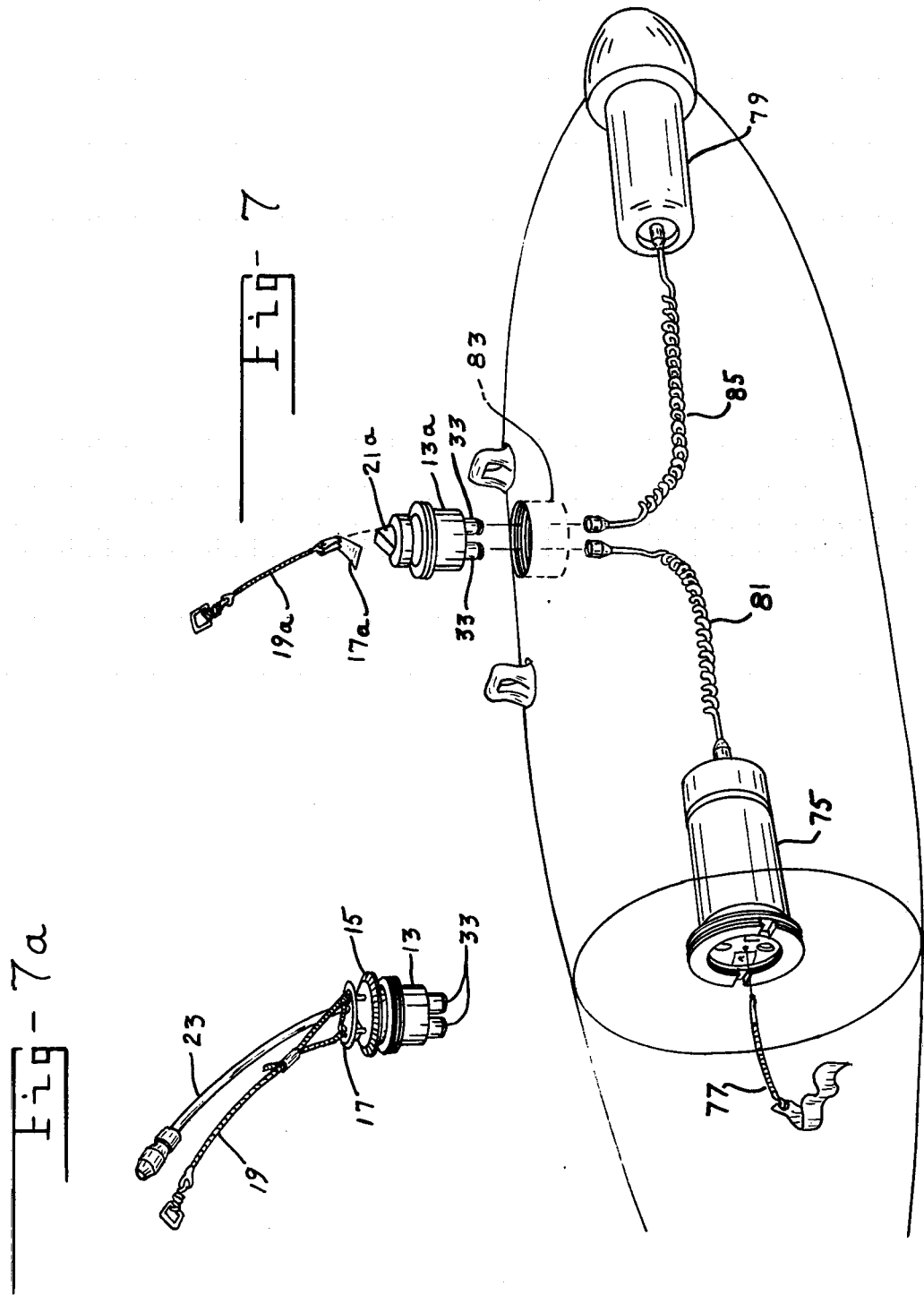

POP-UP COVER FOR SLIPSTREAM GENERATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to an air operated electrical energy generating means for use with an electrical bomb fuze and, more particularly, the invention is concerned with providing a slipstream generator with a pop-up cover that includes a breakaway coaxial cable for carrying electrical signals from the aircraft to the bomb fuze.

In aerial bombardment, it is common safety practice to provide for delay arming of the bomb until the distance between the launching aircraft and the launched bomb is sufficient to prevent damage to the aircraft by detonation of the bomb on arming. To accomplish this where the bomb is provided with an electrical fuze, it is necessary to provide a charging system that positively will not energize the fuze until a prescribed minimum velocity is attained. Heretofore, a special electric charging gear was installed in the aircraft and designed so that the electric bomb fuze became energized while falling from the aircraft just after release. The charging gear was then disengaged and the fuze became fully charged and ready to arming. It can be seen that the safety of the bomb is dependent on the reliability of the various safety devices in the fuze to prevent arming until the bomb has fallen a safe distance from the aircraft. Indeed, a malfunction of the charging or releasing mechanism that occurred while the aircraft was on the ground could lead to premature detonation with the resultant disasterous results to the aircraft and ground personnel in the vicinity.

Another requirement of power systems for charging electrical bomb fuzes occurs where it is necessary to introduce an electrical signal from the aircraft to the fuze system by a radiation hazard mechanism, for example. In this arrangement, a breakaway coaxial cable must be incorporated in the power supply along with a radiation hazard switch connected to the coaxial cable.

SUMMARY OF THE INVENTION

The present invention is concerned with providing an improved power supply which includes a slipstream generator, with a pop-up cover having an air scoop, a switch actuator mechanism and an interface cable attached thereto. A coaxial cable is incorporated in the power supply to permit injection of electrical signals from the aircraft to the fuse system.

In operation, the actuation lanyard is pulled by the aircraft bomb rack lanyard hook as the bomb is released and separates from the aircraft. When the force of the landing is between 50 and 80 lbs., a copper shear pin and switch assembly is sheared, a compressed spring causes a plunger to wedge in a spring contact which is electrically connected to the center conductor of the coaxial cable. As the plunger continues to wedge in the contact, its metal probe breaks through a metal shield held between two insulating surfaces. The plunger then impacts against a metal contact and terminal assembly to interconnect a signal from the coaxial cable to the bomb fuze through the terminal assembly.

Accordingly, it is an object of the invention to provide a charging system for electric bomb fuzes which includes a pop-up cover having an air scoop metal tab and bracket attached thereto moving upward in response to activation by the action of a lanyard.

Another object of the invention is to provide an improved slipstream generator wherein a radiation hazard switch is incorporated therein and includes a breadaway coaxial cable for carrying signals from the aircraft to the bomb fuze system.

Still another object of the invention is to provide an improved slipstream generator for electric bomb fuzes wherein the actuation lanyard is pulled by the aircraft bomb rack lanyard hook when the bomb is released thereby preventing accidental release without activation.

A further object of the invention is to provide an improved electric charging device which includes a radiation hazard switch mechanism as an integral part thereof for activation by the landing force of the bomb.

A still further object of the invention is to provide as improved slipstream generator for use in charging an electric bomb fuze requiring no special mounting racks or connectors for attachment to existing bomb structures.

These and other objects, features, and advantages will become more apparent after considering the following description taken in conjunction with the annexed drawings and appended claims.

BRIEF DESCRIPTION OF THE DRAWINGS

FIG. 7 is an illustration of an electric fuze bomb showing the prior art slipstream generator in position for attachment thereto with the actuation lanyard pulled away to expose the air scoop; and FIG. 7a is a view of the improved slipstream generator according to the invention which replaces the prior art generator shown in FIG. 7.

DESCRIPTION OF A PREFERRED EMBODIMENT

Figure 1:
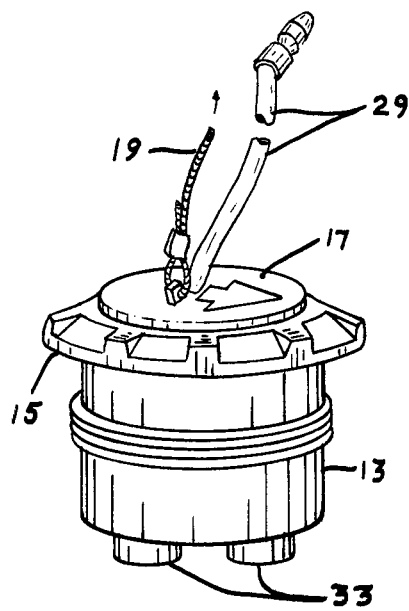
FIG. 1 is a general view of a slipstream generator according to the invention in the closed position showing the actuation lanyard and the breakaway coaxial cable attached to the pop-up cover.
Figure 2:
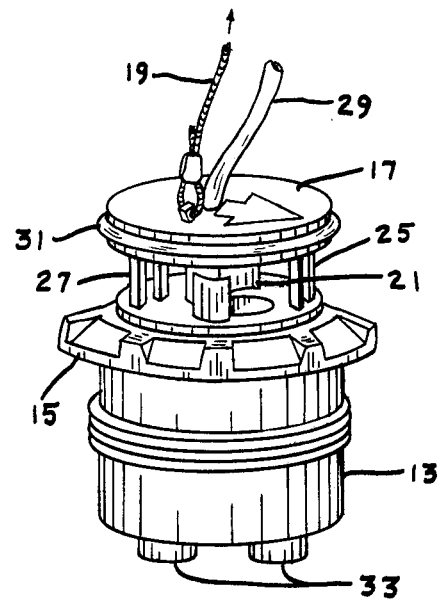
FIG. 2 is a general view of the improved slipstream generator according to the invention in the open position showing the pop-up cover up to expose the air scoop and activate the generator.

Referring now to the drawings wherein like reference characters designate identical parts throughout the several views, in FIGS. 1 and 2 there is shown a preferred embodiment of the invention which is an improvement of a similar prior art device shown in FIGS.

3 and 4. In FIG. 1, the slipstream power supply includes a main housing 13 with a closure and installation ring 15 attached thereto. A cover 17 is positioned in the closure and installation ring 15 for slidable disengagement therefrom as shown in FIG. 2. A lanyard 19 serves to lift the pop-up cover 17 when required to expose the air scoop 21 which includes a pop-up detent incorporated therewith. A bracket 23 shown more clearly in FIG. 5 includes a front guide and pop-up stop 25 and a rear guide, pop-up stop and radiation hazard switch activator 27. A cockpit select cable 29 passes through the cover 17 and into the main housing 13. An O-ring 31 seals the cover to the main housing 13 while the unit is unactivated. The output and interface pins 33 positioned at the bottom of the unit serve to carry the signals to the proper locations.

Figure 3:
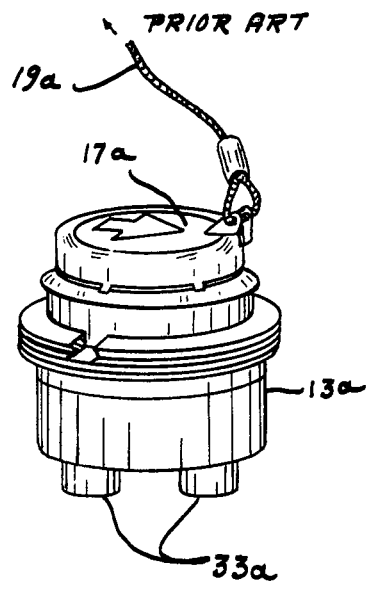
FIG. 3 is a view of a prior art slipstream generator in the closed position.
Figure 4:
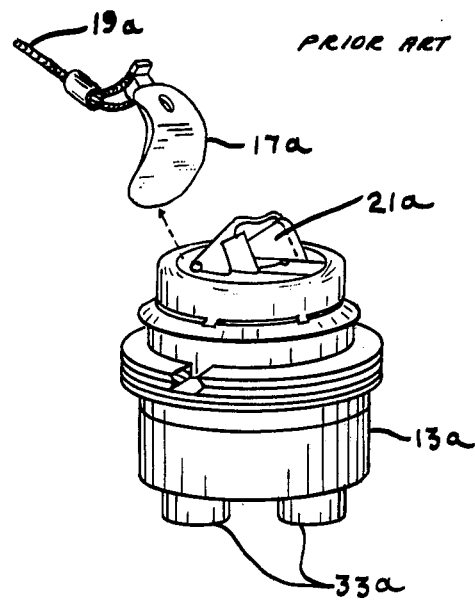
FIG. 4 is a view of the prior art slipstream generator of FIG. 3 in the open position showing the pull tab release arrangement which exposes a spring loaded air scoop when the lanyard is activated.

In the prior art slipstream power supply shown in FIGS. 3 and 4, the cover 17a includes a tear-top which is removed when the lanyard 19a is pulled. The lower portion of the cover 17a remains on the main body 13a because it is crimped therearound. A hinged air scoop 21a which is spring loaded is exposed in the air stream when the tear-top portion of the cover is removed. The output connections 33a operate to carry the signals from the prior art units to the bomb fuze and proximity sensor.

Figure 5:
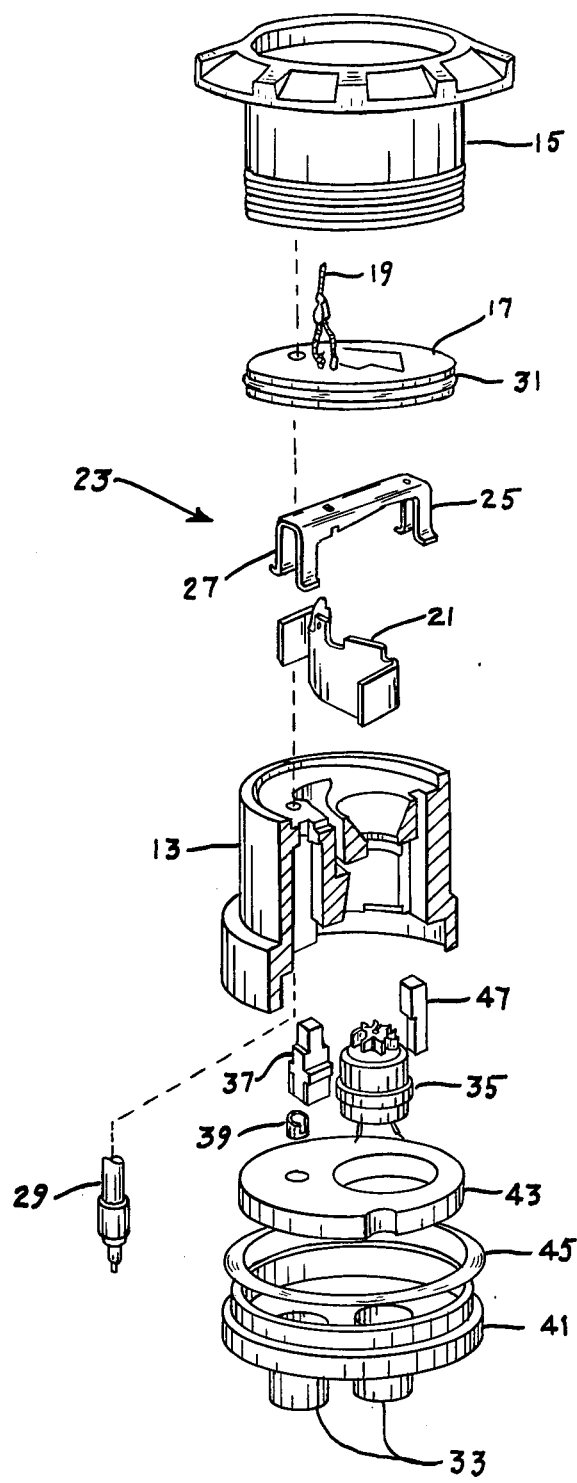
FIG. 5 is an exploded view of the improved slipstream generator according to the invention showing the relative positions of the several elements including the radiation hazard switch.
Figure 6:
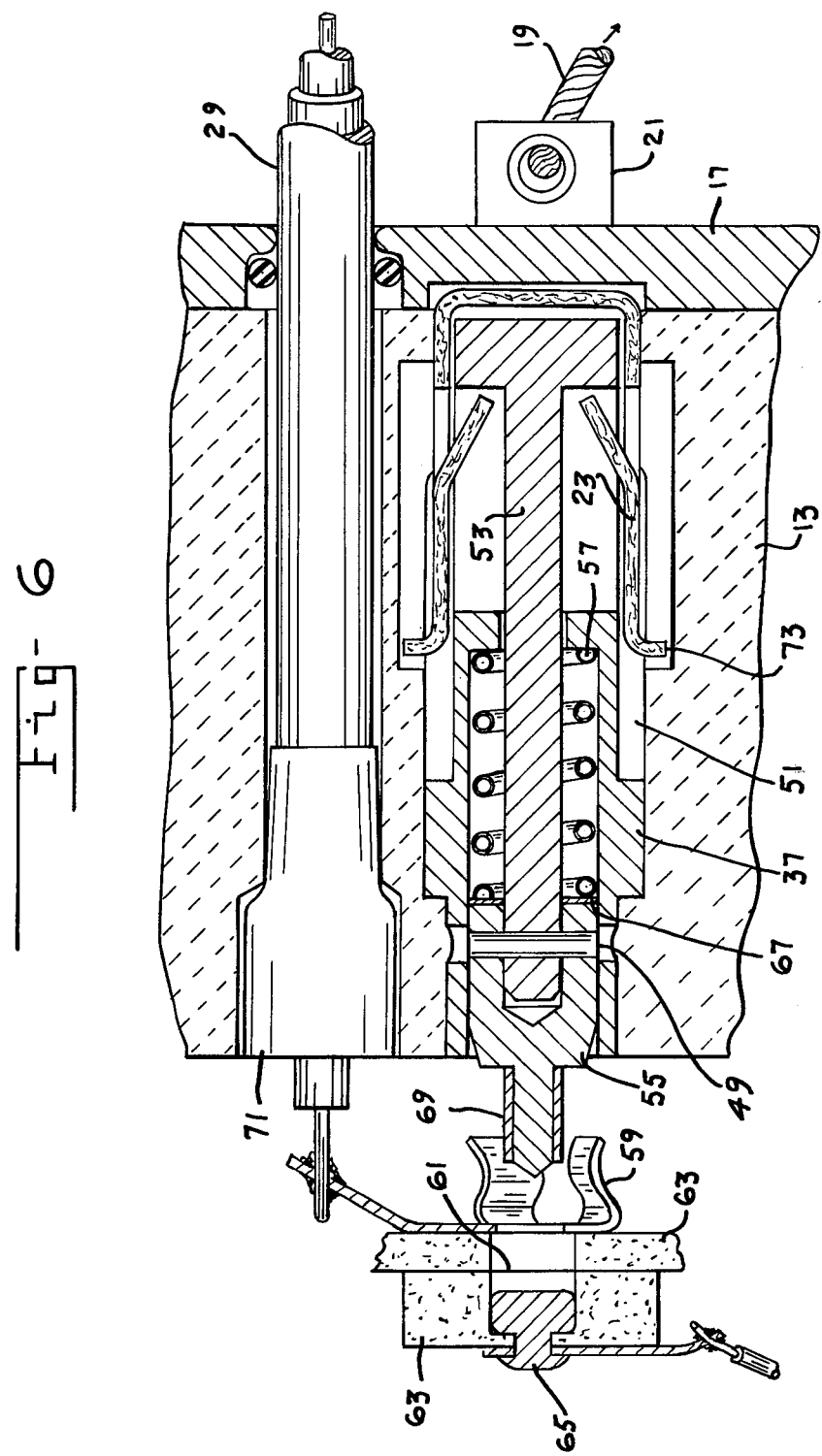
FIG. 6 is a cross-sectional view of the improved slipstream generator radiation hazard switch according to the invention showing the cover in position prior to activation and the radiation hazard switch in the open position.

Referring now to FIG. 5, there is shown an exploded view of the slipstream power supply according to the invention. A turbine generator 35 is positioned in the main housing 13 to receive the air stream from the air scoop 21 and thereby generate the required power. A radiation hazard switch 37 shown in detail in FIG. 6, is also positioned in the main housing 13 and includes the insulator 39 which prevents electrical contact of the coaxial cable 29 with the housing 13. A plastic connnector cap 41 is adapted to receive a spacer 43 therein and includes an O-ring 45 positioned around the outside circumference of the connector cap 41. The plastic plug 47 is also positioned in the main housing 13 near the turbine generator 35.

In FIG. 6 there is shown in greatly enlarged detail, a cross-sectional view of the radiation hazard switch positioned in the main housing 13 with the cover 17 in place. The actuation lanyard 19 is pulled by the aircraft bomb rack lanyard hook (not shown) as the bomb is released and separates from the aircraft. A copper shear pin 49 and switch assembly 51 is sheared as bracket 23 moves upward pulling the switch pin 53 from the plunger 55. The bracket 23 and the metal tab of the air scoop 21 is pulled up by the cover 17 as an integral assembly. After the pin 49 has sheared, the compressed spring 57 forces the plunger 55 to wedge in the spring contact 59 which is electrically connected to the center conductor of the coaxial cable 29. As the plunger 55 continues to wedge in the contact 59, its metal probe breaks through the metal shield 61 held between two insulating surfaces 63. The plunger 55 then impacts against a metal (soft copper with silver plate) contact and terminal assembly 65 to interconnect a signal from coaxial cable 29 to the fuse of the bomb via the terminal assembly 65.

Prior to activation, the center conductor of the coaxial cable 29 and spring contact 59 are isolated from both the plunger 55 and the fuse terminal 65. After activation, the cable center conductor 29 is electrically common to both plunger 55 and terminal 65. The insulators 67 and 69 prevent the spring 57 or shield 61 from electrically shorting to the plunger 55 and grounding the signal. The cable 29 outer shield is grounded to the power supply main housing 13 through a crimp-on sleeve 71 which is part of the coaxial cable 29. After the pin 49 shears and switch activation takes place, the cover 17, bracket 23 and air scoop 21 continue to move upward until the two rear and two forward bracket tabs 73 lock with the main housing 13. The air scoop 21 is spring metal and the tabs shown in FIG. 5 spring apart and prevent the cover 17 from being pushed back down.

The relationship of the bomb-to-power supply is shown in FIG. 7, where the electric bomb fuze 75 is located in the tail well of the bomb and includes a safing pin 77 attached to the rearward end thereof. A proximity sensor 79 is positioned in the nose well of the bomb. A wire cable 81 extends from the charging well 83 to the fuse 75 and a wire cable 85 extends from the well 83 to the proximity sensor 79. The charging device is positioned in the charging well 83 of the bomb.

Although the invention has been illustrated in the accompanying drawings and described in the foregoing specification in terms of a preferred embodiment thereof, the invention is not limited to this embodiment or to the particular configuration disclosed. It will be apparent to those skilled in the art that certian changes, modifications and substitutions can be made, particularly with respect to the construction details, without departing from the true spirit and scope of the appended claims.

Having thus set forth the nature of my invention, what I claim and desire to secure by Letters Patent of the United States is:

1. In an air-flow operated electric bomb charging device for attachment to a bomb having a bomb fuze and including a main housing with a closure and installation ring attached to the upper part thereof carried on the bomb for generating electrical energy to energize the bomb fuze, the improvement comprising a pop-up cover slidably positioned over said installation ring, a lanyard operating to lift said pop-up cover when pulled, an air scoop positioned under said cover for exposure to air-flow when said cover is lifted upward, a bracket positioned between said cover and said air scoop for upward movement when said lanyard is pulled, said bracket including front and rear guide members, said rear guide member including a switch actuator portion as an integral part thereof, and switching means positioned within the main housing of said charging device for connecting a signal carried by a coaxial cable from a remote position to the bomb fuze in response to specific environmental conditions.

2. The improved air-flow operated bomb charging device defined in claim 1 wherein the switching means includes a radiation hazard switch comprising a longitudinally oriented switch pin, a plunger slidably positioned over the lower end of said switch pin, a shear pin passing through the walls of said plunger and the body of said switch pin effectively preventing relative movement therebetween, and biasing means for urging said plunger downward upon fracture of said shear pin.

3. The improved air-flow operated bomb charging device defined in claim 2 wherein the radiation hazard switch includes a spring contact positioned under said plunger and spaced therefrom, said spring contact being operatively connected to the coaxial cable, a metal shield positioned under said spring contact and insulated therefrom, said metal shield being rupturable on forced impact by said plunger, and a metal contact positioned beneath said metal shield and insulated therefrom for halting the downward movement of said plunger and making electrical contact therewith, thereby operatively connecting the coaxial cable center conductor to the metal contact which is connected to the fuze of the bomb.

* * * * *